(12) United States Patent
Aratani et al.

(10) Patent No.: US 6,516,413 B1
(45) Date of Patent: Feb. 4, 2003

(54) APPARATUS AND METHOD FOR USER AUTHENTICATION

(75) Inventors: Toru Aratani, Nakai-machi (JP); Rumiko Kakehi, Nakai-machi (JP); Masaki Kyojima, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/244,129

(22) Filed: Feb. 4, 1999

(30) Foreign Application Priority Data

Feb. 5, 1998 (JP) .......................................... 10-024142

(51) Int. Cl.[7] ................................................. H04L 9/32
(52) U.S. Cl. ....................................... 713/170; 713/182
(58) Field of Search ................................. 713/170, 182, 713/185, 168, 171, 172, 174, 183

(56) References Cited

U.S. PATENT DOCUMENTS 5,987,134 A * 11/1999 Shin et al. ................... 713/159
6,088,450 A * 7/2000 Davis et al. ................. 713/182
6,173,400 B1 * 1/2001 Perlman et al. ............. 713/172

FOREIGN PATENT DOCUMENTS

JP 10-247905 9/1998

* cited by examiner

Primary Examiner—Matthew Smithers
(74) Attorney, Agent, or Firm—Oliff & Berridge, PLC

(57) ABSTRACT

An apparatus and method for user authentication for easily realizing the allocation of a complexity of rights when controlling access by a plurality of users to a plurality of objects. A verification apparatus sends to a proving apparatus required security information that shows the authority property required for access to an object, along with a challenge data and a modulo of a public key. A required security information inspection unit within the proving apparatus obtains the required security information stored in a response data memory and a control information representing a user's authority property stored in a control information memory. It then inspects whether an identifier of:the required security information is included in a list included in the control information. If the identifier is included, a response data is generated, upon! condition that all of challenge data, required security information, access ticket, control information and user identifying information are correct. An access ticket is a result of masking a user's capability, a data representing the extent of his access rights.

11 Claims, 8 Drawing Sheets

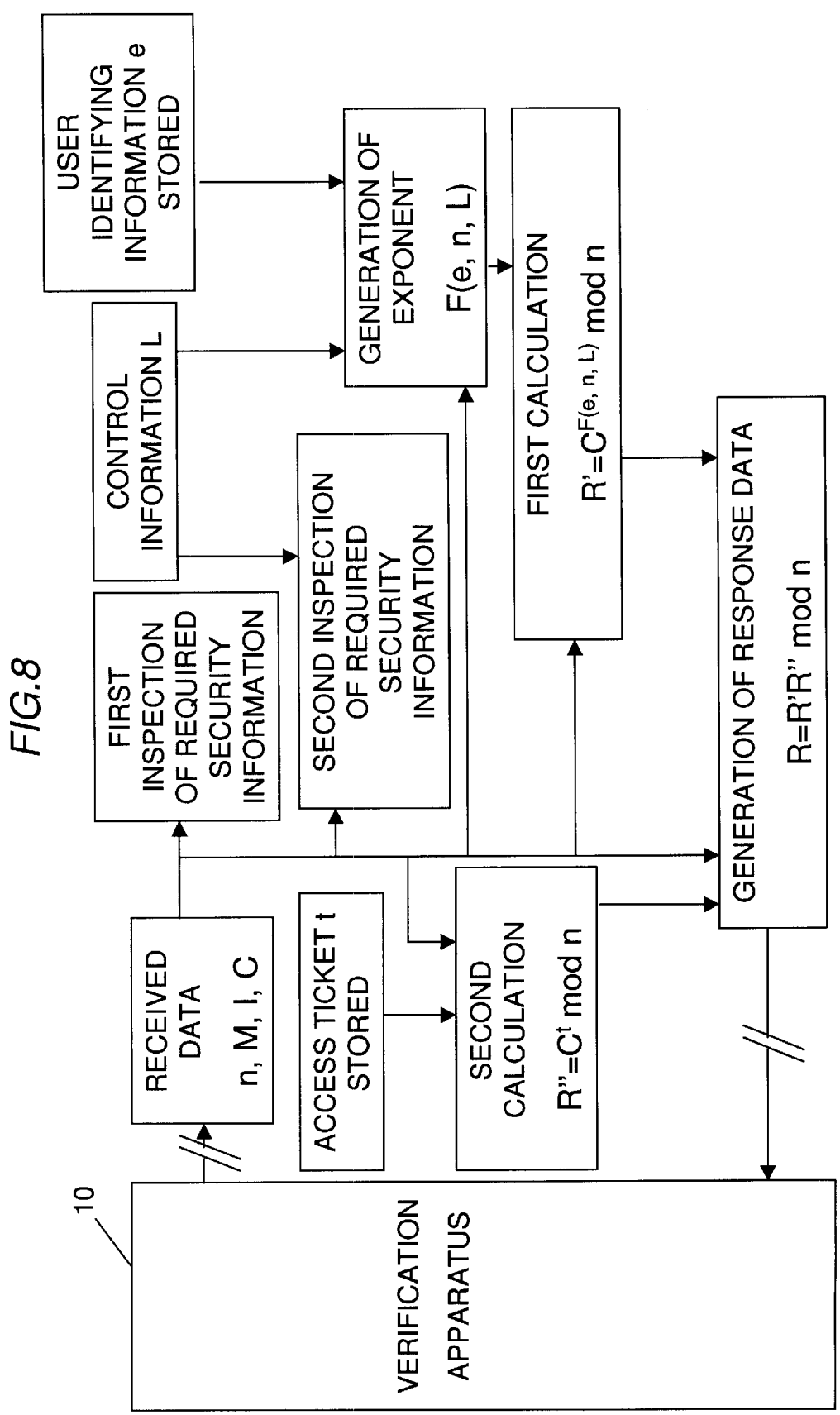

APPARATUS AND METHOD FOR USER AUTHENTICATION

BACKGROUND OF THE INVENTION

1. Field of the Invention

This invention relates to a technique and methods for authenticating a user's access rights to digital data, services, and the like, by applying encryption and decryption.

2. Discussion of the Related Art

Methods with which to authenticate users' access rights can be largely divided into two types.

In the first type, an access right verifier possesses a list of users having an access right to an object(referred to as an access control list from hereinafter), The verifier, upon a user's request for access, examines if the user is included in the list, and determines his accessibility.

In the second type, a user possesses a data, or a "capability" that shows his access right to an object. When requesting for access, a user proves to an access right verifier that he holds a capability. The verifier determines the user's accessibility by examining whether or not the possession of the capability has been correctly proven.

There is a critical problem to the first type when the object to be accessed is such digital contents as digital data or an application program operated on a computer or the like.

Digital contents can easily be copied. Even when an access right to the original content can be authenticated, it is not possible to authenticate the access right to a copied digital content.

In order to solve this problem, it is possible to make the digital content, the access right verifier and the access control list inseparable so that the access right verifier and the access control list are copied when the digital content itself is copied. However, when an access control list to a content needs to be changed, it is almost impossible to change the access control lists of every copy of the content that have been distributed until then.

Using capabilities is a more appropriate and effective way for authentication of users' access rights to digital contents, but there is a problem with this method as well.

A capability is data representing a user's access right that can be copied. When a user, possessing a capability to a digital content makes a copy of his capability and provides it to a third person without a legitimate access right, it becomes possible for the third person to access to the content.

An apparatus for controlling access to digital data suggested in the Japanese Laid-Open Patent No.10-247905 by some of the inventors of the present invention aims to solve this problem. The apparatus consists of a proving apparatus to prove possession of a user's access right to a digital content and a verification apparatus to verify the result of the proving apparatus.

The proving apparatus possesses user identifying information which is not revealed, to the user. The capability to a digital content is masked using the user identifying information and handed out to each user as an "access ticket".

The proving apparatus proves the capability of a user using the access ticket and the user identifying information. Access tickets are masked using a value unique to each user so that it is not possible for a third person to prove his capability with a copied access ticket.

The method as suggested in Japanese Laid-Open Patent No.10-247905 is a method that distributes capabilities to users while preventing illegal access by users' copying of capabilities.

The verification apparatus of this method possesses an encrypted digital content and an encrypted key $K^*(=K^E \bmod n)$, which is obtained by encrypting the decryption key K of the digital content with an RSA(Rivest-Shamir-Adleman) modulo n and an encryption key E. The proving apparatus possesses such tamper-resistant hardware as an IC card that can perform modular exponentiation and calculate one-way Hash function f(x;y). User identifying information e is stored in the IC card.

A decryption key D correspondent to the RSA modulo n and the encryption key E represent a capability for access to a digital content.

An access ticket t is data with a value as shown in the following equation (1).

$$t = D - f(e;n) \tag{1}$$

The possession of a capability is proven if the proving apparatus can decrypt $K^*$ correctly and the verification apparatus can obtain the decryption key K of the digital content.

(1) The verification apparatus generates a random number r.

(2) The verification apparatus calculates $C = r^E K^* \bmod n$ and sends n and C to the proving apparatus.

(3) The proving apparatus calculates $R_1 = C^{f(e;n)} \bmod n$ inside the IC card.

(4) The proving apparatus calculates $R_2 = C^t \bmod n$.

(5) The proving apparatus calculates $R = R_1 R_2 \bmod n$ and sends the result to the verification apparatus.

(6) The verification apparatus calculates $r^{-1}$ that satisfies the equation, $r^{-1}r \equiv 1 \bmod n$, then calculates $K' = r^{-1}R \bmod n$.

If the above process is performed correctly, then the possession of the capability is proven since as shown in the following equation (2), $K \equiv K' \bmod n$ is obtained.

$$\begin{aligned} K' &\equiv r^{-1}R \\ &\equiv r^{-1}R_1 R_2 \\ &\equiv r^{-1}C^{f(e;n)}C^t \\ &\equiv r^{-1}C^{f(e;n)+t} \\ &\equiv r^{-1}C^D \\ &\equiv r^{-1}(r^E K^*)^D \\ &\equiv r^{-1}(r^E K^E)^D \\ &\equiv r^{-1}rK \\ &\equiv K \quad \bmod n \end{aligned} \tag{2}$$

With this method, if each user holds an IC card containing user identifying information e, then the access ticket necessary for access to a digital content will be different for each user. The possession of a capability cannot be proven using an access ticket of another user.

The problem with the above method is, however, that there is only a limited degree of flexibility when distributing capabilities.

Capability is represented here as a RSA decryption key D. The capability shows the possession of an access right to a digital content the RSA public key of which was used in calculating $K^*$ corresponds to D. Thus, it is required that the digital contents accessible with capability $D_1$ and the digital contents accessible with capability $D_2$ do not overlap. With capabilities having such a restriction, it is very difficult to distribute capabilities when the boundaries of the scope of digital contents accessible by each user are entangled in a complex manner.

For example, when:

(1) Set $S_A$ of digital contents accessible by user A is a subset of set $S_B$ of digital contents accessible by user B; or (2) Set $S_A$ of digital contents accessible by user A and set $S_B$ of digital contents accessible by user B do not coincide but have an intersection which is not empty.

With the method as suggested above, it is not possible to express the access rights of user A with a single capability $D_A$ or the access rights of user B with a single capability $D_B$. Instead, in example (1), capabilities need to be distributed in the following manner:

(1) A capability $D_1$ representing the access rights to $S_A$; and (2) A capability $D_2$ representing the access rights to $S_B-S_A$.

User A holds an access ticket of capability $D_1$ and user B holds access tickets for both capabilities $D_1$ and $D_2$.

In example (2), the following three kinds of capabilities need to be distributed:

(1) A capability $D_1$ showing the access rights to $S_A \cap S_B$;

(2) A capability $D_2$ showing the access rights to $S_A-S_B$; and (3) A capability $D_3$ showing the access rights to $S_B-S_A$.

User A holds access tickets for capabilities $D_1$ and $D_2$ and user B holds access tickets for capabilities $D_1$ and $D_3$.

When such a complicated relationship exists among a large number of users, one capability needs to be distributed for one digital content, with each user holding the same number of access tickets as the number of digital contents to which, he has rights to access. As the number of digital contents increases, the administration cost of the distributors of capabilities and the cost of managing access tickets become huge.

When controlling access rights to documents in an office, for example, where hundreds of thousands of digital contents need to be managed, the number of digital contents a single person can access to is perhaps more than ten thousand. It is highly difficult for the distributor of capabilities to manage all of the capabilities and for the users to manage all of his access tickets.

SUMMARY OF THE INVENTION

In response to the above described need, the present invention provides an apparatus and methods to render management of access tickets easier when distributing capabilities using access tickets.

The present invention includes an apparatus for user authentication that verifies the legitimacy of a proof data generated to prove a right of a user.

A first storage unit stores a challenge data and a second storage unit stores a control information. A third storage unit stores an authentication support information that is generated according to a predetermined relationship between an authentication characteristic information and the control information. A forth storage unit stores a required security information.

A required security information inspection unit inspects whether or not the required security information and the control information satisfy a predetermined relationship. A response data generation unit generates the response data according to an inspection result of the required security information inspection unit using the challenge data, the control information, the required security information and the authentication support information. A verification unit determines whether or not the response data is generated based on the authentication characteristic information.

The response data generation unit generates a legitimate response data only when all of the challenge data, the control information, the required security information and the authentication support information are legitimate.

Unlike the method suggested in the prior art, this invention does not use only authentication characteristic information as capability. According to this invention, the control information includes information that defines the extent of the capability a user possesses, and a required security information includes information that defines the capability needed for access to a content. This way, the scope of the capability of a user can be set flexibly and the possession of capability can be examined by the required security information inspection unit.

Moreover, a user cannot replace the control information or the required security information with illegitimate data because then, a correct response data is not generated.

In another embodiment according to the present invention, the user authentication apparatus verifies the legitimacy of a proof data generated prove a right of a user with the following method.

A first storage unit stores a challenge data and a second storage unit stores a control information. A third storage unit stores an authentication support information that is generated according to a predetermined relationship between an authentication characteristic information and the control information. A forth storage unit stores a required security information. A fifth storage unit stores an inspection information of the required security information.

A first required security information inspection unit inspects whether or not an output data generated according to a predetermined relationship between the challenge data and the required security information satisfies a predetermined relation with the inspection information stored in the fifth storage unit. A second required security information inspection unit inspects whether or not the control information and the required security information satisfy a predetermined relationship. A response data generation unit generates the response data according to respective inspection results of the first and second required security information inspection units using at least the challenge data, the control information, the required security information and the authentication support information. A verification unit performs an operation dependent upon whether or not the response data generated by the response data generation unit is generated based ion the authentication characteristic information.

The response data generation unit generates a legitimate response data only when all of the challenge data, the control information, the required security information and the authentication support information are legitimate.

Here again, the user authentication apparatus does not use only authentication characteristic information as capability, unlike the method suggested in the prior art. The control information includes information that defines the extent of the:capability a user possesses, and a required security information includes information that defines the capability needed for access to a content. This way, the scope of the capability of a user can be set flexibly and the possession of capability can be examined by the required security information inspection unit.

The legitimacy of the required security information is examined in the first required security information inspection unit and a correct response data is not generated unless the required security information is correct. Therefore, a user cannot replace the control data or the required security data with illegitimate data.

The present invention may also be realized as a user authentication method or a computer program product.

Furthermore, a user authentication program product executed on a computer, or the like may be realized as a storage medium readable by a computer storing the computer program. The storage medium transforms energy conditions of magnetism, optics, electricity or the like in accordance with the contents of the program, and sends correspondent signals to a reader equipped to hardware resources of the computer. The storage medium may be, for example, a magnetic disk, optical disk, CD-ROM or an internal memory of the computer. The computer, in this case, has an apparatus that can read the storage medium and execute processes according to the program.

BRIEF DESCRIPTION OF THE DRAWINGS

The accompanying drawings, which are incorporated in and constitute a part of this specification, illustrate embodiments of the present invention and, together with the description, serve to explain the advantages and principles of the invention. In the drawings:

FIG. 8 illustrates the operations of the proving apparatus in the second embodiment of the present invention.

DETAILED DESCRIPTION OF THE PREFERRED EMBODIMENTS

First Embodiment

The first embodiment of the present invention is an access right authentication apparatus that consists of a verification apparatus and a proving apparatus. The verification apparatus accompanies a digital content to which an access right is to be verified and verifies whether or not a user possesses a legitimate access right to the digital content. The proving apparatus, which is possessed by a user of a digital content, proves to the verification apparatus that the user has a legitimate access right.

Figure 1:
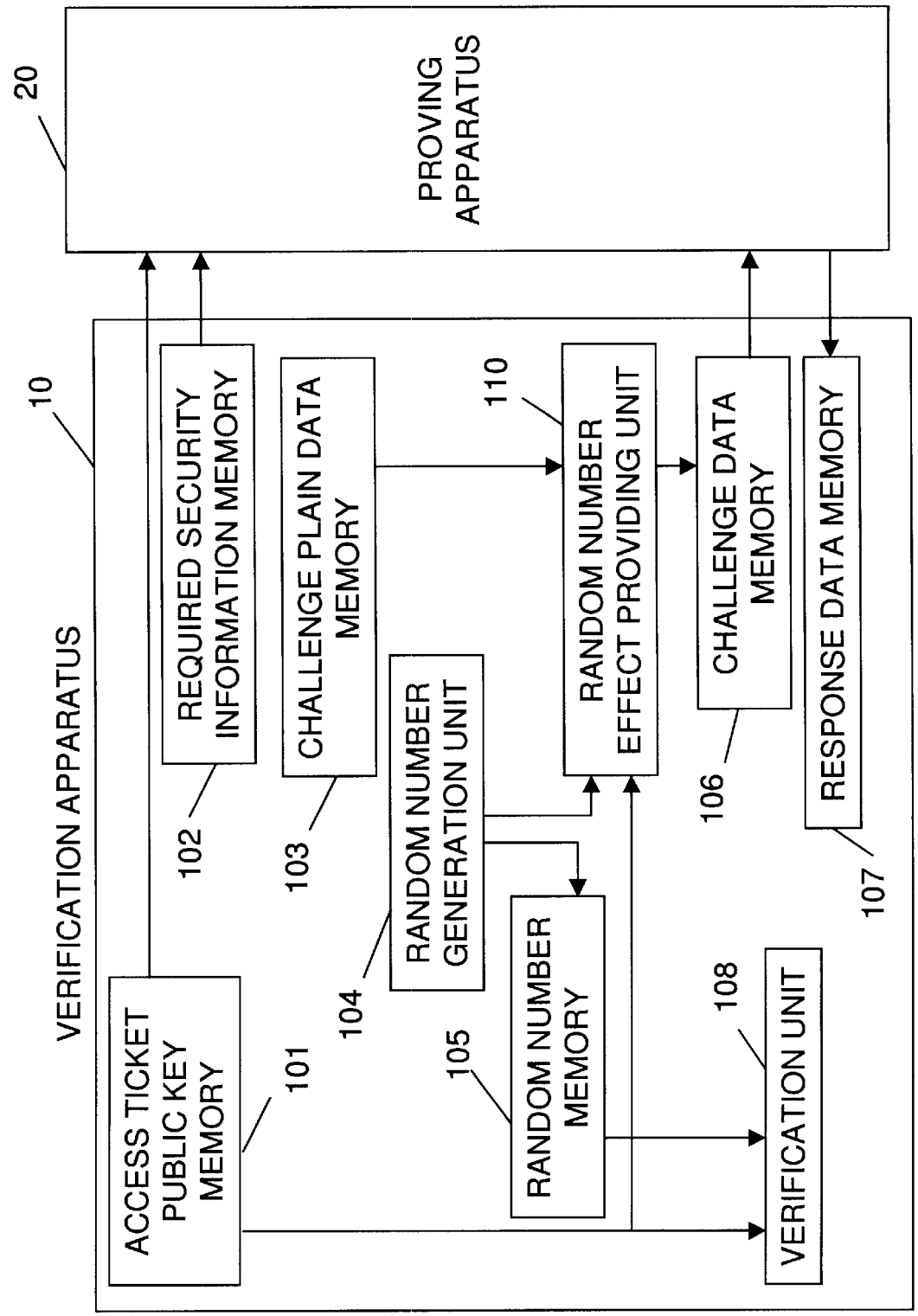
FIG. 1 is an exemplary block diagram illustrating the construction of a verification apparatus in a first embodiment of the present invention.

FIG. 1 shows a construction of a verification apparatus 10 of the first embodiment. As shown in FIG. 1, a challenge data is generated using an challenge plain data within an challenge plain data memory 103, a random number generated by a random number generation unit 104 and an access ticket public key within, an access ticket public key memory 101. The challenge data is stored in a challenge data memory 106, and then sent to a proving apparatus 20. A modulo of the access ticket public key and a required security information, are also sent to the proving apparatus 20.

Figure 2:
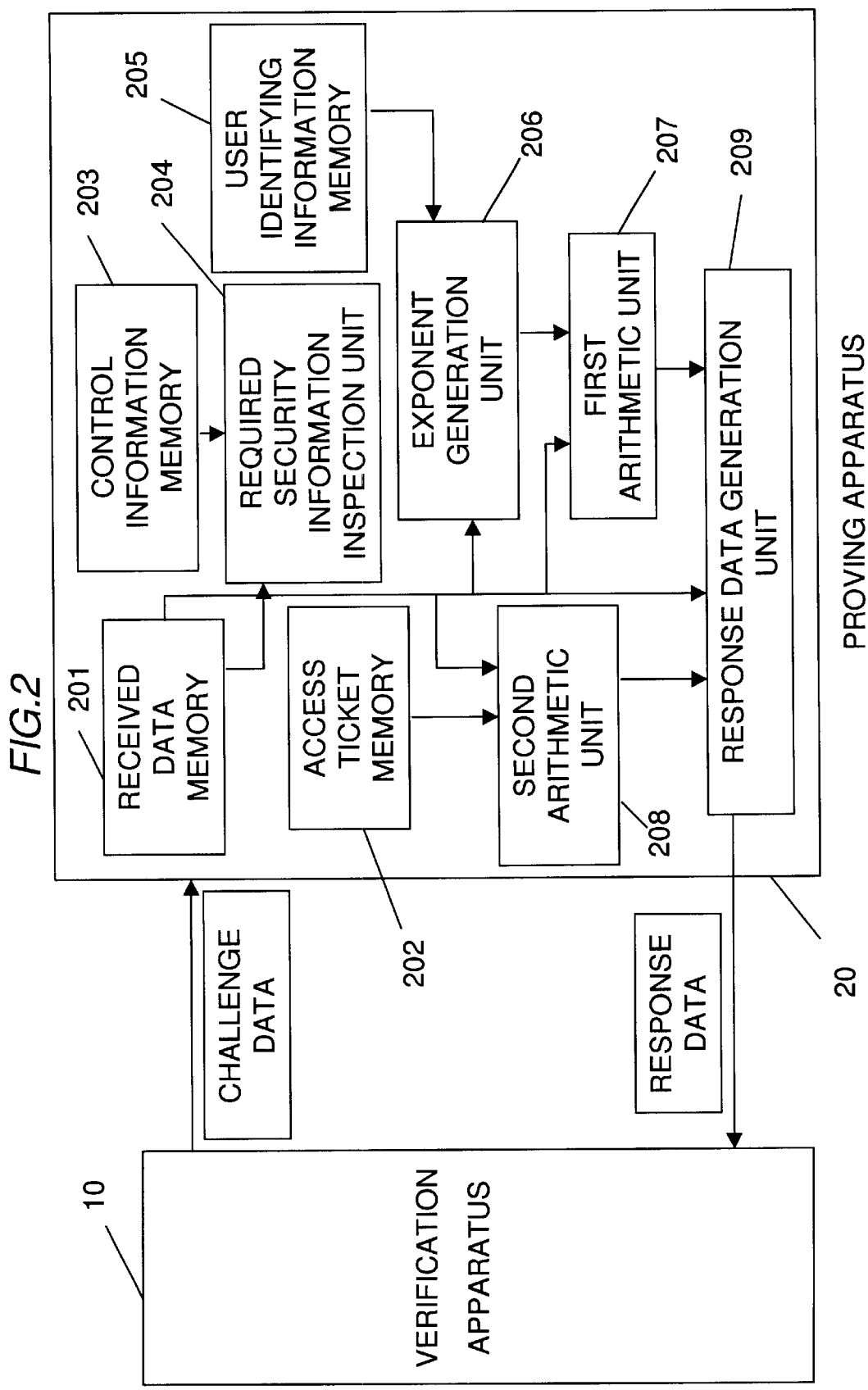
FIG. 2 is an exemplary block diagram illustrating the construction of a proving apparatus in the first embodiment of the present invention.

FIG. 2 shows a construction of a proving apparatus 20 of the first embodiment. As shown in FIG. 2, a received data memory 201 stores the challenge data, the required security information and the modulo sent from the verification apparatus 10. A required security information inspection unit 204 compares the required security information sent from the verification apparatus 10 with a control information stored within a control information memory 203. A response data generation unit 209 generates a response data with an exponent generation unit 206, a first arithmetic unit 207 and a second arithmetic unit 208, based upon such data as an access ticket, challenge data and user identifying information. The response data is sent back to the verification apparatus 10.

In FIG. 1, a response data memory 107 of the verification apparatus 10 stores the response data sent from the proving apparatus 20. A verification unit 108 verifies the response data using a verification data, the random number and the modulo of the access ticket public key.

In the first embodiment, the challenge data sent from the verification apparatus 10 is the result of encrypting the verification data. The proving apparatus 20 generates the response data by decrypting the challenge data. The verification apparatus 10 verifies the response data by determining whether or not the response data is the result of correctly decrypting the challenge data.

Generation of response data requires 5 types of data: challenge data, user identifying information, access ticket, control information and required security information.

User identifying information is digital data unique to each user of a service or a digital data. It is stored in a user identifying information memory 205 within the proving apparatus 20, and is inaccessible to the user.

Control information is data qualifying a user's underlying capability represented by an authentication characteristic information, and is stored in the control information memory 203 within the proving apparatus 20. It is a list of identifiers of the digital contents the user can access to.

An access ticket is digital data generated from the decryption key (the authentication characteristic information in access right authentication), user identifying information and control information. It is needed to generate the challenge data and is stored in an access ticket memory 202 within the proving apparatus 20.

Required security information signifies the identifier of a digital content and represents. the capability necessary for access to the digital content. It is stored in a required security information memory 102 within the verification apparatus 10 and is sent to the proving apparatus 20 together with the challenge data.

Here, it is examined whether or not the identifier of the required security information exists in the list of identifiers included in the control information before the response data is generated by the proving apparatus 20. The response data is generated only when the identifier of the digital content is included in the list. The user can access to a digital content only when he has the necessary capability, since an access right is not authenticated unless the response data is generated.

Since all five of challenge data, user identifying information, access ticket, control information and required security information are requisite for the generation of correct response data, prevention of illegal access by replacing the control information, the required security information or the access ticket is possible.

In the first embodiment, the authentication characteristic information D of access right authentication, corresponding public information E and n and required security information I are expressed by the following equations.

n is a RSA modulo that is a product of two, sufficiently large prime numbers, p and q, satisfying the following equation (3).

$$n=pq \quad (3)$$

φ(n) is the Euler number of n and is calculated by equation (4).

$$\phi(n)=(p-1)(q-1) \quad (4)$$

The authentication characteristic information D is the RSA private key and can be expressed by equation (5).

$$gcd(D, \phi(n))=1 \quad (5)$$

Here, gcd(x, y) denotes the greatest common divisor of two numbers, x and y. The required security information is a prime number satisfying the following equation (6).

$$gcd(I, \phi(n))=1 \quad (6)$$

Public information E is generated as to satisfy equation (7).

$$EID \bmod \phi(n)=1 \quad (7)$$

D is called an access ticket private key and the pair of E and n is called an access ticket public key hereinafter.

Access ticket t is generated with the following equation (8), using the access ticket private key D, user identifying information e, modulo n and control information L.

$$t=D-F(e, n, L) \quad (8)$$

User identifying information e is unique to each user and is used to distinguish between the users.

Function F is a function the function value of which does not easily collide. It may be expressed as in equation (9) or (10), using one-way hash function h, for example.

$$F(x, y)=h(x|y) \quad (9)$$

$$F(x, y, z, u, w)=h(x|y|z|u|w) \quad (10)$$

Here, x|y denotes the concatenation of two bit-string representations of x and y.

One-way hash function is a function in which it is highly difficult to compute two different values x and y satisfying the equation, h(x)=h(y). MD2, M4, MD5 by RSA Data Security Inc. and SHS(Secure Hash Standard) by the US government are well-known examples of one-way hash function.

It is possible to open t, E, n and I to the public. On the contrary, D, e, p, q, φ(n) and the function F may not be revealed to anyone not possessing the right to generate access tickets.

Figure 3:
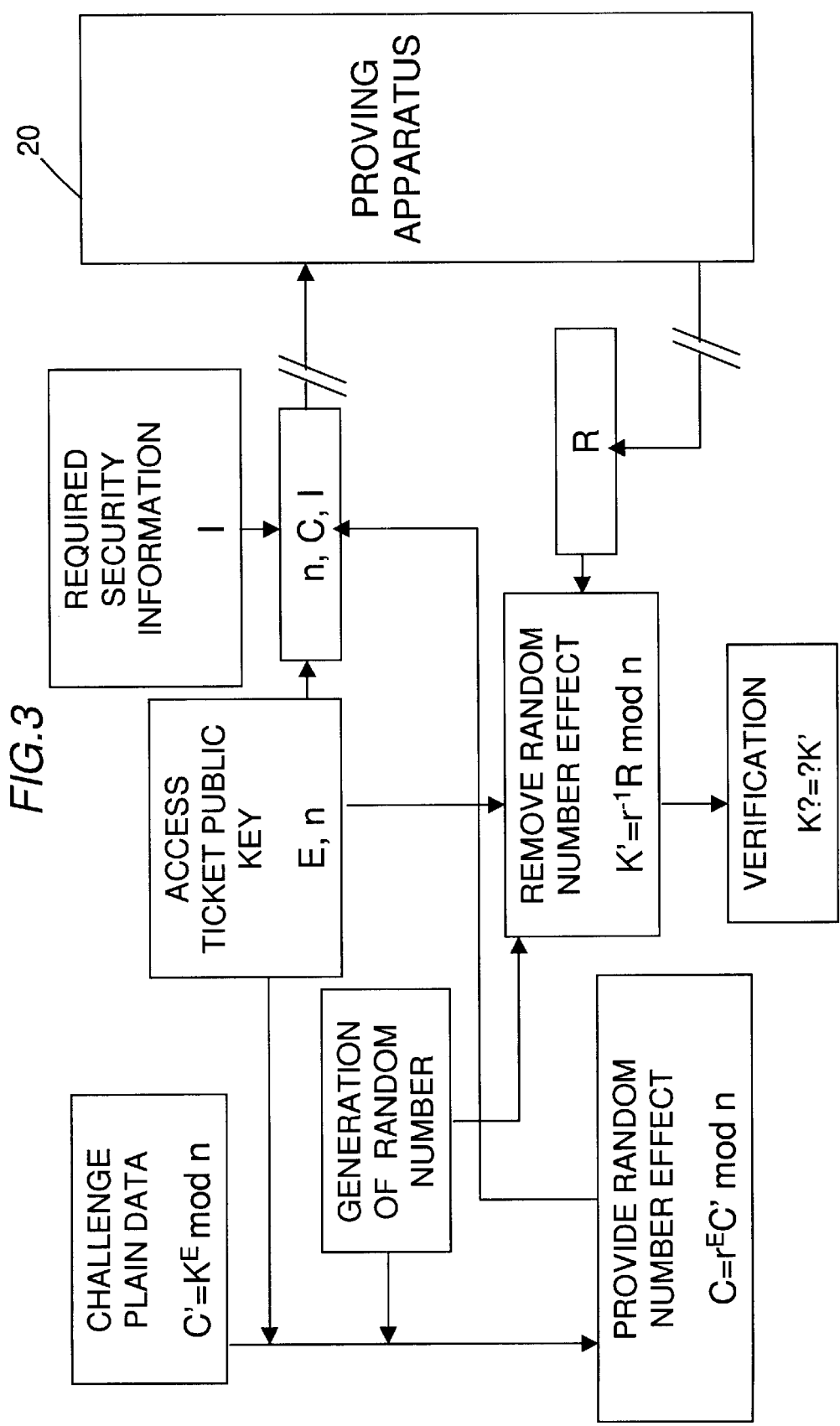
FIG. 3 illustrates the operations of the verification apparatus in the first embodiment of the present invention.
Figure 4:
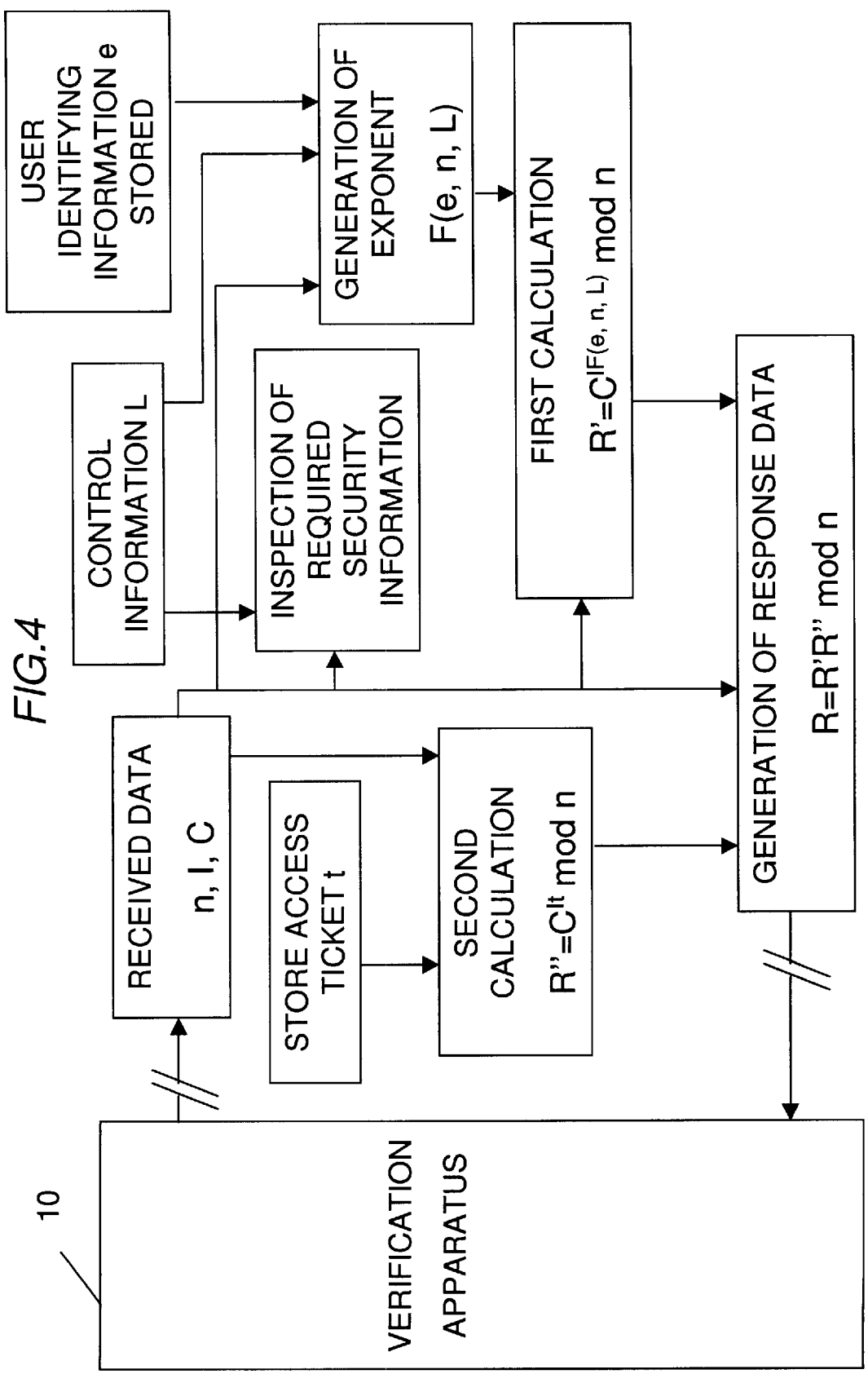
FIG. 4 illustrates the operations of the proving apparatus in the first embodiment the present invention.

FIG. 3 and FIG. 4 respectively show the operations of the verification apparatus 10 and the proving apparatus 20 in the first embodiment.

Step 1. The verification apparatus 10 is activated when a user attempts to access to a digital content that requires authentication by the access right authentication apparatus.

If the verification device 10 is implemented as a part of an application program running on a PC, workstation and the like of the user, the user activates it as an application program, using an instruction device such as a keyboard or mouse. The verification device 10 is activated when execution of the application program reaches a constituting program of the verification device 10.

If the verification apparatus 10 is implemented on another PC or workstation (referred to as server) connected by a network system, the user activates a communication program on his own PC or workstation. Then the communication program transmits a channel open request to the server in accordance with predetermined procedures, activating the verification apparatus 10 on the said server. For example, suppose the communication program of the user follows a procedure called TCP/IP(Transmission Control Protocol/Internet Protocol) for communicating with the server. The verification device is associated with a specific port of the server in advance and the communication program of the user is set so as to designate the port and transmit a TCP connection request to the server. It is then possible for a daemon (inetd) on the server to activate the verification device in reply to the TCP connection request. This method of implementation is widely used in the network such as the Internet.

The verification apparatus 10 may also be implemented as an exclusive-purpose device. For example, it is possible to implement the verification device 10 as a program written in a ROM in an IC card reader/writer, and the proving apparatus 20 as a program within a microcontroller of an IC card. In such a case, the verification apparatus 10 is activated when a user inserts the IC card into the reader-writer.

Step 2. The verification apparatus 10 sends a challenge data C, modulo n stored in the access ticket public key memory 101 and required security information I stored in the required security information memory 102 to the received data memory 201 within the proving apparatus 20.

The challenge data C is generated by randomizing challenge plain data C' stored in the challenge plain data memory 103. The challenge plain data C' satisfies the following equation (11), with K being the verification data.

$$C'=K^E \bmod n \quad (11)$$

The challenge data C is generated in the random number effect providing unit 110 within the verification apparatus 10 by calculating the following equation (12), using a random number r generated in the random number generation unit 104, public key E and n obtained from the access ticket public key memory 101, and C' obtained from the challenge plain data memory 103. The challenge data C is stored both in the response data memory within the proof apparatus 20 and the challenge data memory 106 within the verification apparatus 10. The random number r is stored in a random number memory 105.

$$C=r^E C' \bmod n \quad (12)$$

Here, as well as in the second embodiment of the present invention, by giving a random number effect to the challenge data and having the effect removed when verifying the response data sent. back by the proving apparatus, it is possible to prevent replay attacks.

In addition, the verification apparatus 10 may be configured so that it does not hold the verification data K, but holds only C', which is an encryption result of K. By giving the verification apparatus means to verify the coincidence between K and the result of removing the random number effect from the response data transmitted from the proving apparatus 20, the risk of verification data K being leaked from the verification apparatus 10 can be avoided.

Step 3. The required security information inspection unit 204 within the proving apparatus 20 obtains required security information I stored in the received data memory 201 and control information L stored in the control information memory 203 in order to examine whether or not the identifier of the required security information I exists in the list contained in the control information L. If it exists, the following calculations are performed.

Step 4. The exponent generation unit 206 within the proving apparatus 20 obtains user identifying information e stored in the user identifying information memory 205, modulo n stored in the received data memory 201 and the control information L stored in the control information memory 203 to perform the following equation (13).

$$F(e, n, L) \qquad (13)$$

Step 5. The first arithmetic unit 207 within the proving apparatus 20 obtains the required security information I and modulo n stored in the received data memory 201, and using them together with the data generated in the exponent generation unit 206, calculates the following equation (14) to obtain R'.

$$R' = C^{IF(e, n, L)} \bmod n \qquad (14)$$

Step 6. The second arithmetic unit 208 within the proving apparatus 20 obtains the access ticket t stored in the access ticket memory 202, challenge data C, the required security information I and modulo n stored in the received data memory 201, and calculates the following equation (15) to obtain R".

$$R'' = C^{It} \bmod n \qquad (15)$$

Step 7. The response data generation unit 209 within the proving apparatus 20 obtains R' and R" from the first arithmetic unit 207 and the second arithmetic unit 208 respectively and obtains response data R by calculating the following equation (16).

$$R = R'R'' \bmod n \qquad (16)$$

Step 8. The proving apparatus 20 sends the response data R to the response data memory 107 within the verification apparatus 10.

Step 9. A random number effect removing unit, which comprises a part of the verification unit 108 within the verification apparatus 10, takes out the random number r from the random number memory 105 and calculates the following equation (17).

$$K' = r^{-1} R \bmod n \qquad (17)$$

Step 10. The resulting data K' is verified to coincide with the verification data K. They coincide with each other only when the combination of the access ticket t, the user identifying information e, the required security information I and the control information L used in the proving apparatus 20 is legitimate. Thus, correct verification is completed.

Step 11. The verification apparatus 10 proceeds with the regular process of accessing to the digital content only when K'=K is established.

In step 3, if the identifier of the required security information I does not exist in the list contained in the control information L, it signifies that the user does not possess the capability necessary to access to the digital content. In such a case, the proving apparatus 20 discontinues the generation of the response data and notifies the verification apparatus 10 of the discontinuation. Such notification may be transmitted, for example, by sending a discontinuation code to the response data memory 107, or presetting the time required for generating response data and discontinue the process if response data is not sent to the response data memory 107 after the preset time has passed.

If the inspection of the required security information inspection unit 204 is complete and all of the above procedures are performed correctly, it can be said that K and K' coincide with each other as shown in the following equation (18).

$$\begin{aligned} K' &\equiv r^{-1} R \\ &\equiv r^{-1} R' R'' \\ &\equiv r^{-1} C^{IF(e,n,L)} C^{It} \\ &\equiv r^{-1} C^{ID} \\ &\equiv r^{-1} (r^E C')^{ID} \\ &\equiv r^{-1} (r^E K^E)^{ID} \\ &\equiv r^{-1} r K \\ &\equiv K \bmod n \end{aligned} \qquad (18)$$

If an intruder illegally replaces any one of the required security information I, the control information L, or the access ticket t, K will not coincide with K', thereby he is not able to access to the service or the digital data.

Several methods that may used in the verification apparatus 10 to verify that K coincides with K' are discussed hereinafter. These methods are applicable to the second embodiment of the present invention as well.

[1] Direct Comparison of the Verification Data and the Decryption Result

The verification data K is stored in the verification unit 108 within the verification apparatus 10 in advance. A comparison part within the verification unit 108 directly compares the verification data K with the data K', which is the result of decrypting the challenge data. Normal processes proceed only when K'=K is established. Otherwise, the process is discontinued or other types of error handling processes are conducted.

This method, however, has a security flaw in that the verification data K itself, which is the object of verification, appears in the verification apparatus 10. If the verification apparatus is implemented as a program running on a PC or a workstation of a user, for example, it is not impossible to analyze the program and steal K, difficult it may be. If the value of K is made known to a user, it is possible for him to construct an apparatus that performs identical operations to that of the proving apparatus 20, rendering illegitimate access by impersonation possible.

[2] Use of One-way Function

To overcome the above flaw, data h(K), the result of applying one-way hash function h on K, may be stored in the verification unit 108 for verification, instead of K itself. It is characteristic of one-way hash function that it is extremely difficult to calculate x that satisfies the equation y=h(x) from y, data used for verification stored in the verification unit 108.

The verification unit 108 has a transformation part that outputs the result of applying a one-way hash function on input data. The comparison part compares the output h(K') obtained by applying the hash function on the data K', the result of decrypting the challenge data, with the stored data h(K).

In this method, the verification data K itself does not appear in the program. Moreover, it is extremely difficult to calculate K from h(K) stored in the verification unit 108, therefore being more secure than the method of example [1].

However, since the comparison part is implemented as conditional statements in the program, there remains a flaw when the verification apparatus 10 is a program having a configuration that is easy to analyze or tamper with because it is then possible to tamper with the program to skip the conditional statements.

[3] Use of Decrypted Value as a Decryption Key for Decrypting Specific Data

The data stored for verification is encrypted data, the decryption key of which is the data K' generated by decrypting the challenge data. The verification unit 108 uses the value of K' as a decryption key to decrypt the encrypted data stored for verification. If the encrypted data is successfully decrypted, the program can be executed. In this configuration, a relatively high security is assured since the decryption key itself does not appear in the verification apparatus 10.

[4] Confirmation of a Specific Redundancy of the Decrypted Value

The verification unit 108 has a redundancy confirmation part to which the verification unit transmits the value of K' generated by decrypting the challenge data. Only when the redundancy confirmation unit confirms that the data has a specific redundancy, can the program be executed. Some examples of redundancy are: a repetition of specific patterns within decrypted data, data in a specific position satisfying a specific condition, or data having a meaning in a specific language.

[5] Encryption of the Program Code

Data generated by encrypting a part or all of the program code itself held by the verification apparatus is stored as challenge data in a challenge data memory(the challenge plain data memory 103 in the first embodiment). This means that the data K' generated by decrypting the challenge data is a part or all of the program code.

The verification unit 108 embeds the data K' in a predetermined position of the program and then executes the program. If the proving apparatus 20 returns the correct (meaning that K' is the result of correctly decrypting the code) data, the program can be executed.

The verification unit 108 may generate a file with the decrypted code embedded and then activate the file. However, to ensure a higher degree of security, it is desirable to embed the decrypted code in a program being expanded on the memory, and then activate it.

In this method, a part or all of the code indispensable for execution of the program is encrypted. Therefore, illegitimate execution of the program can be prevented even if the program is implemented as an application program running on the user's PC or workstation, in which case the security level is relatively low.

[6] Use of Decrypted Value as a Decryption Key of a Program

In this method, the verification unit 108 holds data generated by encrypting a decryption key K and data generated by encrypting a part or all of the program by the key K. Data K' generated by decrypting the challenge data is the decryption key to the encrypted program code. With this configuration, it is possible to keep the size of data K' small regardless of the size of the code to be encrypted, thereby reducing an overhead in communication.

The verification unit decrypts the stored encrypted program code using the data K'. The execution part embeds the decrypted code in a predetermined position in the program and then executes the program. The program can be executed only when the proving apparatus returns the correct data, that is, the code is correctly decrypted by the data K'.

Second Embodiment

The second embodiment of the present invention is also an access right authentication apparatus that consists of a proving apparatus and a verification apparatus.

Figure 5:
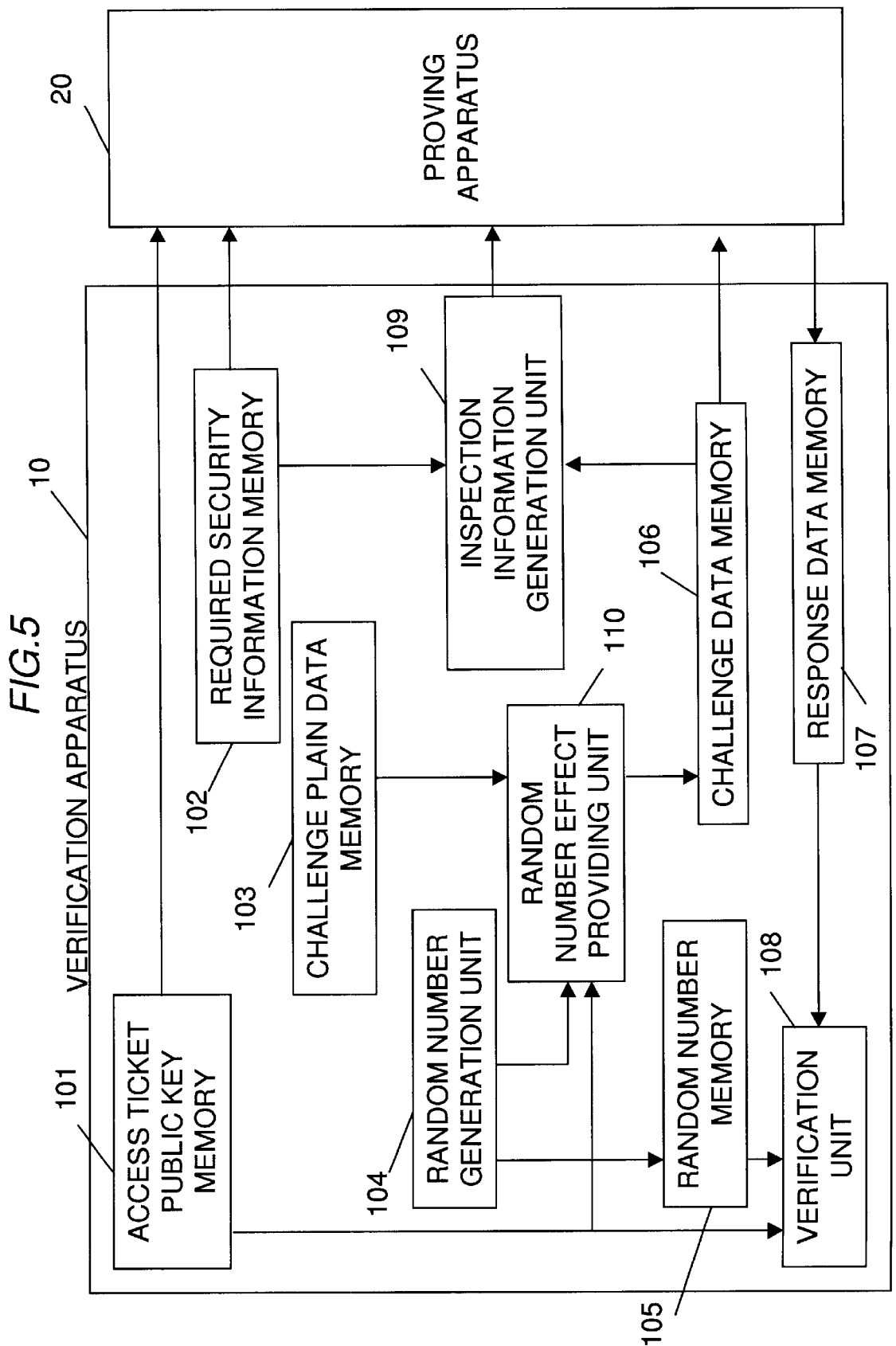
FIG. 5 an exemplary block diagram illustrating the construction of a verification apparatus in a second embodiment of the present invention.
Figure 6:
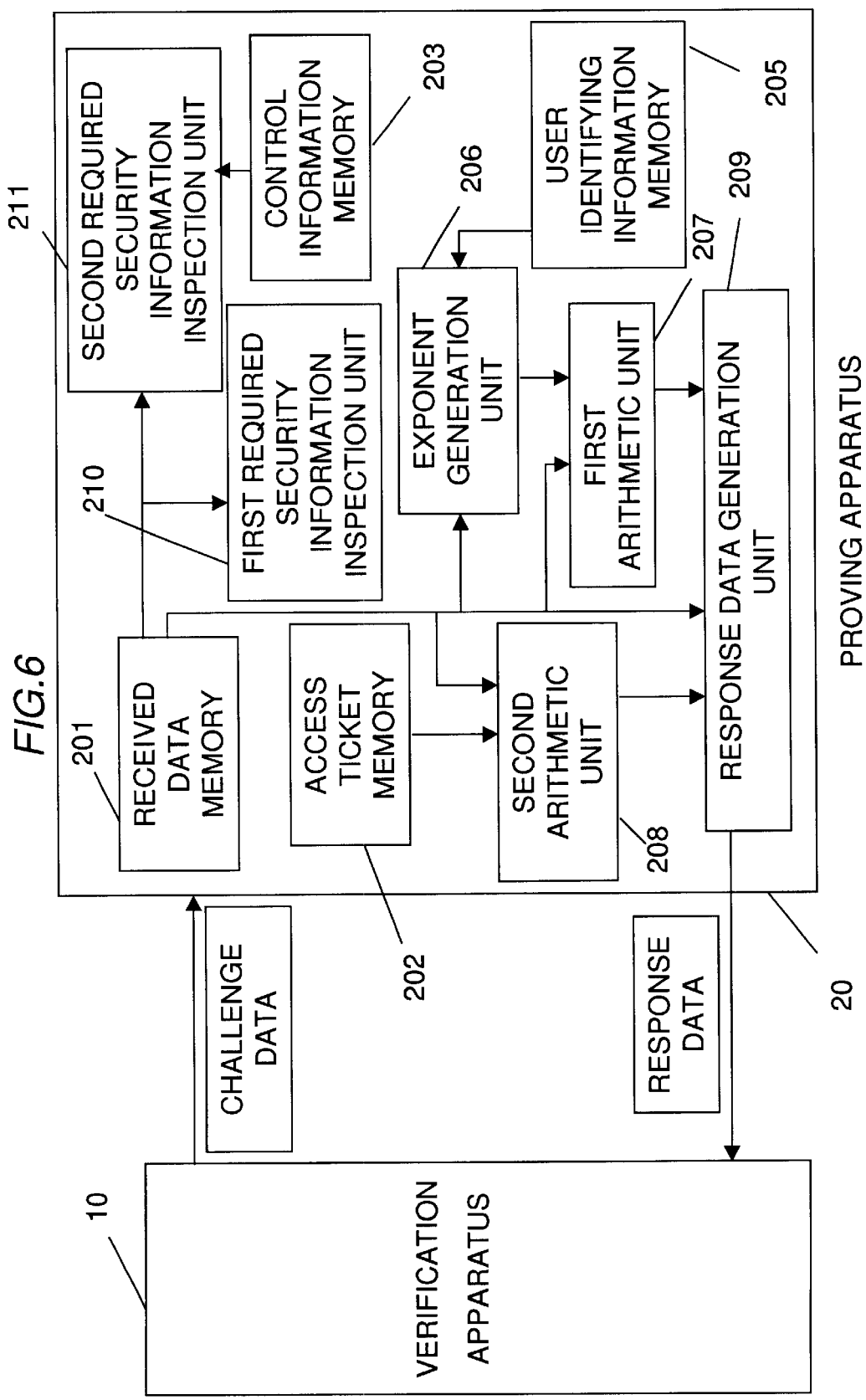
FIG. 6 an exemplary block diagram illustrating the construction of a proving apparatus in the second embodiment of the present invention.

FIG. 5 and FIG. 6 show constructions of a verification apparatus 10 and a proving apparatus 20 of the second embodiment, respectively. In FIGS. 5 and 6, the parts correspondent to those in FIGS. 1 and 2 have the same numbers and are not discussed here in detail. In the second embodiment, an inspection information generation unit 109 is added to the verification apparatus 10. A first required security information inspection unit 210 and a second required security information inspection unit 211 are added to the proving apparatus 20. The second required security information inspection unit 211 is correspondent to the required security information inspection unit 204 in the first embodiment.

In the second embodiment, generation of response data requires 6 types of data: challenge data, user identifying information, access ticket, control information, required security information and inspection information.

Required security information represents the capability necessary for access to the digital content. It is stored in a security required information memory 102 and is sent to the proving apparatus together with the challenge data. In the second embodiment, it is a list of character strings representing the types of digital contents.

Inspection information is generated within the verification apparatus 10 and sent to the proving apparatus 20 with the challenge data and the required security information. The proving apparatus 20 uses this information to inspect whether or not the required security information sent from the verification apparatus 10 is correct.

Control information is data representing a user's capability, and is stored within the proving apparatus 20. It is a list of character strings representing the types of the digital contents the user can access to.

In this embodiment, the proving apparatus 20 confirms, before generating the response data, that the required security information is not replaced in any way using the inspection information. If it is confirmed, then it is examined if ail of the character strings contained in the required security information are included in the list within the control information. If all are included, the proving apparatus generates the response data. If either of these two examinations fails, the response data is not generated. A user can access to a digital content only when he has the necessary capability, since an access right is not authenticated unless the response data is generated.

Here, all six of challenge data, user identifying information, access ticket, control information, required security information and inspection information are requisite for the generation of correct response data. Therefore, illegal access by replacing the control information, required security information or the access ticket can be prevented.

Figure 7:
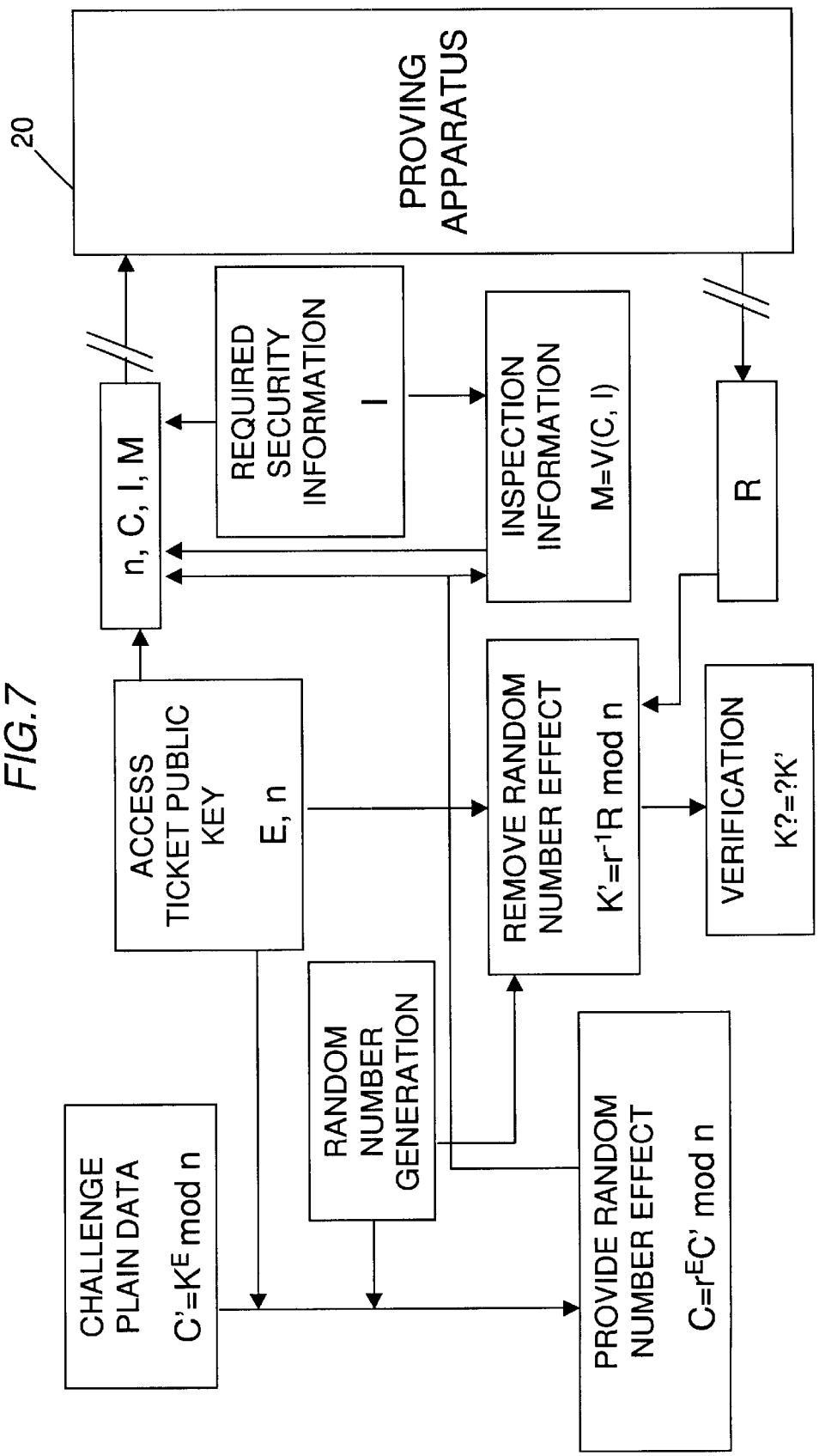
FIG. 7 illustrates the operations of the verification apparatus in the second embodiment of the present invention.

FIGS. 7 and 8. respectively show the basic operations of the verification apparatus 10 and the proving apparatus 20 in the second embodiment.

Here, the characteristics and the roles of authentication characteristic information D of access right authentication, RSA modulo n and its Euler number $\phi(n)$ are similar to those in the first embodiment and are not discussed in detail.

Access ticket public key E is generated as to satisfy the following equation (19).

$$ED \bmod \phi(n)=1 \tag{19}$$

Access ticket t is generated, as in the first embodiment, using the access ticket private key D, user identifying information e, modulo n, control information L and function F, with the following equation (20).

$$t=D-F(e, n, L) \tag{20}$$

Step 1. The verification apparatus 10 is activated upon access from the user. The manner of activation is the same as in the first embodiment and is not discussed here in repetition.

Step 2. The inspection information generation unit 109 within the verification apparatus 10 obtains challenge data C and required security information I stored in the required security information memory 102 to generate inspection information M with the following equation (21).

$$M=V(C, I) \tag{21}$$

Function V is a function having similar characteristics to that of function F, and must only be revealed to the verification apparatus 10 and the proving apparatus 20. Here, challenge data C is generated with the same method as in Step 2 of the first embodiment.

Step 3. The verification apparatus 10 sends challenge data C, modulo n stored in the access ticket public key memory 101, required security information I and inspection information M stored in the required security information memory 102 to the received data memory 201 within the proving apparatus 20.

Step 4. The first required security information inspection unit 210 within the proving apparatus 20 verifies that the following equation (22) holds between required security information I, challenge data C and inspection information M that are stored in the received data memory 201.

$$M=V(C, I) \tag{22}$$

The following processes are performed when the values satisfy this equation.

Step 5. The second required security information inspection unit 211 within the proving apparatus 20 verifies that all of the character strings in the required security information I stored in the received data memory 201 exist in the control information L stored in the control information memory 203. If all exist, the following calculations are performed.

Step 6. The exponent generation unit 206 within the proving apparatus 20 obtains user identifying information e stored in the user identifying information memory 205, modulo n stored in the received data memory 201 and the control information L stored in the control information memory 203 to perform the following equation (23).

$$F(e, n, L) \tag{23}$$

Step 7. The first arithmetic unit 207 within the proving apparatus 20 obtains the challenge data C and modulo n stored in the received data memory 201, and using them together with the data generated in the exponent generation unit 206, calculates the following equation (24) to obtain R'.

$$R'=C^{F(e, n, L)} \bmod n \tag{24}$$

Step 8. The second arithmetic unit 208 within the proving apparatus 20 obtains the access ticket t stored in the access ticket memory 202, challenge data C and modulo n stored in the received data memory 201, to calculate the following equation (25) to obtain R".

$$R''=C^t \bmod n \tag{25}$$

Step 9. The response data generation unit 209 within the proving apparatus 20 obtains R' and R" from the first arithmetic unit 207 and the second arithmetic unit 208 respectively to obtain response data R by calculating the following equation (26).

$$R=R'R'' \bmod n \tag{26}$$

Step 10. The proving apparatus 20 sends the response data R to the response data memory 107 within the verification apparatus 10.

Step 11. A random number effect removing unit, which comprises a part of the verification unit 108 within the verification apparatus 10, takes out the random number r from the random number memory 105 and calculates the following equation (27).

$$K'=r^{-1}R \bmod n \tag{27}$$

Step 12. The resulting data K' is verified to coincide with the verification data K. They coincide with each other only when the combination of the access ticket t, the user identifying information e and the control information L used in the proving apparatus 20 is legitimate. Thus, correct verification is completed.

If, in step 4, the values of required security information 1, challenge data C and inspection information M do not satisfy the equation (22) and fails to pass the inspection of the first required security information inspection unit 210, it signifies that either of the three data is not correct. In such a case, the correctness of the required security information cannot be proven, therefore the proving apparatus 20 discontinues the generation of response data and informs the verification apparatus 10 of the discontinuation.

In step 5, if the inspection by the second required security information inspection unit 211 fails, it signifies that the user does not possess the capability necessary to access to the digital content. In such a case, the proving apparatus 20 discontinues the generation of the response data and notifies the verification apparatus 10 of the discontinuation.

Such notice may be transmitted, for example, by sending a discontinuation code to the response data memory 107, or presetting the time required for generating response data and discontinue the process if response data is not sent to the response data memory 107 after the preset time has passed.

If the inspections of the first and second required security information inspection units 210, 211 are complete and all of the above procedures are performed correctly, it can be said that K and K' coincide with each other as shown in the following equation (28).

$$\begin{aligned} K' &\equiv r^{-1}R \\ &\equiv r^{-1}R'R'' \\ &\equiv r^{-1}C^{F(e,n,L)}C^t \\ &\equiv r^{-1}C^D \\ &\equiv r^{-1}(r^E C')^D \\ &\equiv r^{-1}(r^E K^E)^D \end{aligned} \tag{28}$$

-continued $$\equiv r^{-1} rK$$

$$\equiv K \mod n$$

If an intruder illegally replaces control information L or the access ticket t, K will not coincide with K', thereby he is not able to access to the service or the digital data. Therefore, the correct combination of the control information L and the access ticket t is required for a user to access to a digital content or a service.

The methods with which to compare K' and verification data K discussed in the first embodiment may be used in the second embodiment as well.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A user authentication apparatus that verifies the legitimacy of a response data generated to prove a right of a user, comprising:
   a first storage unit that stores a challenge data;
   a second storage unit that stores a control information;
   a third storage unit that stores an authentication support information which is generated according to a predetermined relationship between an authentication characteristic information and the control information;
   a forth storage unit that stores a required security information;
   a required security information inspection unit that inspects whether the required security information and the control information satisfy a predetermined relationship;
   a response data generation unit that generates the response data according to an output from the required security information inspection unit using the challenge data, the control information, the required security information and the authentication support information; and
   a verification unit that determines whether the response data is generated based on the authentication characteristic information.

2. The user authentication apparatus as set forth in claim 1, wherein the authentication characteristic information is a first decryption key, the required security information is a second decryption key, the challenge data is a data encrypted using an encryption key correspondent to the decryption keys and the verification unit verifies whether the response data generated by the response data generation unit is the correctly decrypted challenge data.

3. The user authentication apparatus as set forth in claim 1, wherein the predetermined relationship between the required security information and the control information is that an information of the required security information exists within the control information.

4. The user authentication apparatus as set forth in claim 1, wherein the right of the user to be authenticated is a right to use a digital data or a program.

5. The user authentication apparatus as set forth in claim 3, wherein the right of the user to be authenticated is a right to use a digital data or a program.

6. The user authentication apparatus as set forth in claim 5, wherein the information included in the required security information and the control information is an identifier of the digital data or the program.

7. The user authentication apparatus as set forth in claim 5, wherein the information included in the required security information and the control information is a property information of the digital data or the program.

8. A user authentication apparatus that verifies the legitimacy of a response data generated to prove a right of a user, comprising:
   a first storage unit that stores a challenge data;
   a second storage unit that stores a control information;
   a third storage unit that stores an authentication support information which is generated according to a predetermined relationship between an authentication characteristic information and the control information;
   a forth storage unit that stores a required security information;
   a fifth storage unit that stores an inspection information of the required security information;
   a first required security information inspection unit that inspects whether an output data generated according to a predetermined relationship between the challenge data and the required security information satisfies a predetermined relation with the inspection information;
   a second required security information inspection unit that inspects whether the control information and the required security information satisfy a predetermined relationship;
   a response data generation unit that generates the response data according to respective outputs from the first and the second required security information inspection units using the challenge data, the control information and the authentication support information; and
   a verification unit that determines whether the response data is generated based on the authentication characteristic information.

9. A user authentication apparatus that authenticates a right of a user to use an object by verifying the legitimacy of a response data generated to prove the rights of the user, comprising;
   a first storage unit that stores a challenge data;
   a second storage unit that stores a first authority property allocated to the user;
   a third storage unit that stores an authentication support information which is generated according to a predetermined relationship between an authentication characteristic information and the first authority property;
   a forth storage unit that stores a second authority property needed for access to the object;
   an authority property inspection unit that inspects whether or not the first authority property and the second authority property satisfy a predetermined relationship;
   a response data generation unit that generates the response data according to an output from the authority property inspection unit using the challenge data, the first authority property, the second authority property and the authentication support information; and
   a verification unit that determines whether the response data is generated based on the authentication characteristic information.

10. A user authentication method for authenticating a right of a user to use an object by verifying the legitimacy of a response data generated to prove the rights of the user, comprising the steps of;

storing a challenge data;

storing a first authority property allocated to the user;

storing an authentication support information which is generated according to a predetermined relationship between an authentication characteristic information and the first authority property;

storing a second authority property needed for access to the object;

inspecting whether the first authority property and the second authority property satisfy a predetermined relationship;

generating the response data according to an output from the inspection step using the challenge data, the first authority property, the second authority property and the authentication support information; and verifying whether the response data is generated based on the authentication characteristic information.

11. A storage medium readable by a computer, storing a program of instructions executable by the computer to perform a method for authenticating a right of a user to use an object by verifying the legitimacy of a response data generated to prove the rights of the user, comprising the steps of;

storing a challenge data;

storing a first authority property allocated to the user;

storing an authentication support information which is generated according to a predetermined relationship between an authentication characteristic information and the first authority property;

storing a second authority property needed for access to the object;

inspecting whether the first authority property and the second authority property satisfy a predetermined relationship;

generating the response data according to an output from the inspection step using the challenge data, the first authority property, the second authority property and the authentication support information; and verifying whether the response data is generated based on the authentication characteristic information.

* * * * *